Figure 1:
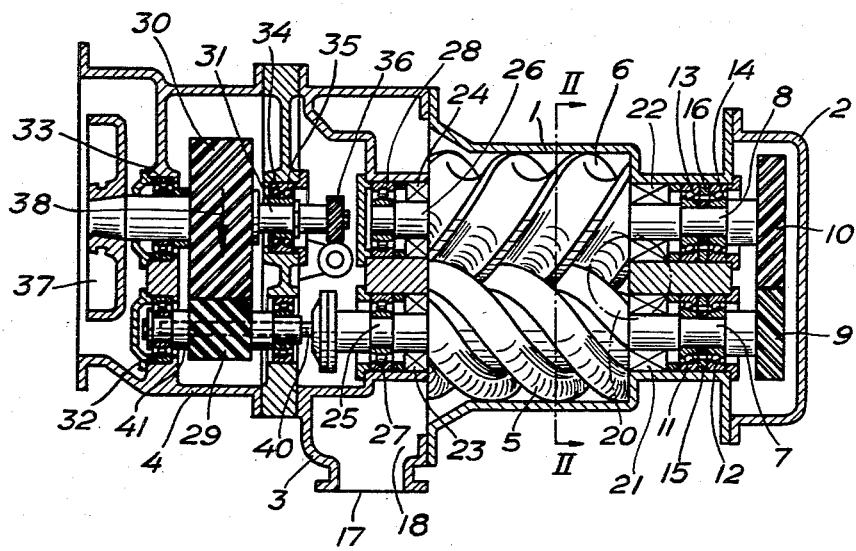

May 3, 1960   S. I. TRULSSON   2,935,247
SCREW-ROTOR COMPRESSOR
Filed Dec. 30, 1958

United States Patent Office 2,935,247
Patented May 3, 1960

2,935,247
SCREW-ROTOR COMPRESSOR

Sven Ivar Trulsson, Nacka, Sweden, assignor to Atlas Copco Aktiebolag, Nacka, Sweden, a corporation of Sweden Application December 30, 1958, Serial No. 783,949

5 Claims. (Cl. 230—143)

This invention relates to screw-rotor compressors operating on an elastic working fluid and comprising a casing and male and female screw-type rotors mounted in bearings in said casing and intermeshing to form working chambers for said working fluid which working chambers move from an inlet opening in the casing to an outlet opening in the casing. Compressors of this type have an efficiency which due to the high number of revolutions of the compressor rotors and the considerable load on the rotors is dependent substantially on the clearances between the rotors and the casing and between the rotors themselves and on the arrangement of and friction losses in the bearings for the rotors and the driving gear. One object of the invention is to provide a bearing arrangement in which the friction losses are small and in which the load on the bearings is reduced and in which small clearances may be maintained between the rotors and the casing and between the rotors themselves. For these and other purposes I provide a screw-rotor compressor of the type above described in which the screw rotors are interconnected at one end by synchronizing gears and in which one of said rotors is connected at the opposite end to a cylindrical helical pinion driven by a cylindrical helical driving gear having a diameter larger than that of the pinion coupled to a high-speed motor. According to the invention the screw rotors at the synchronizing end of the rotors are mounted in twin angle ball bearings capable of taking radial load and axial thrust in both directions and at the opposite end of the rotors in radial roller bearings, and that the cylindrical helical pinion is mounted in radial roller bearings and coupled to the male rotor, the incline of the teeth and the direction of rotation of the helical pinion being such that the thrust originating from said pinion in operation to drive the rotors counteracts the thrust produced by the air forces on he rotor to which said pinion is coupled thereby reducing the load on the ball bearings mounting the synchronizing end of the rotors. The male rotor in a screw compressor of this type usually operates with a speed which is 50 percent higher than the speed of the female rotor and the main part of the torque of the compressor originates from the male rotor. The speed and load conditions of the bearings of the female rotor are therefore not so difficult to handle. The axial thrust on the male rotor is partially balanced by the thrust from the helical gears. The above arrangements result in bearing loads for the male rotor bearings which are so reduced that all the rotating parts of the compressor in spite of the high number of revolutions and considerable axial forces may be mounted in ball and roller bearings which are not unduly stressed and consequently the friction losses in the bearings of the compressor are very low. The mounting of the rotating compressor parts according to the invention makes it furthermore possible to keep very close clearances between the rotors and the casing and between the rotors themselves since the bearings may be mounted substantially without play, and consequently a high overall efficiency is obtained.

Figure 2:
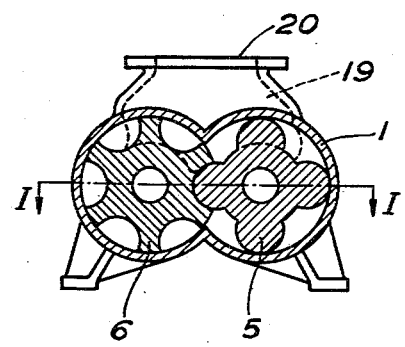

In the accompanying drawing one embodiment of a screw-rotor compressor according to the invention is illustrated by way of example. Fig. 1 is a longitudinal horizontal section of a screw-rotor compressor according to the invention, and Fig. 2 is a transverse section on lines II—II of Fig. 1.

The illustrated screw-rotor compressor consists of a rotor casing 1, a synchronizing gear casing 2 bolted to one end of said rotor casing, an intermediate casing 3 bolted to the opposite end of the rotor casing, and a drive gear casing 4 bolted to said intermediate casing. A male screw rotor 5 and a female rotor 6 are mounted in the rotor casing 1 and provided with shafts 7 and 8, respectively, which carry cylindrical intermeshing helical synchronizing gears 9 and 10. The shafts 7 and 8 are mounted in twin angle ball bearings 11, 12 and 13, 14, respectively, separated by a calibrated, exchangeable washer 15, 16, respectively and capable of taking axial thrust in both directions. By providing washers 15, 16 of suitable thickness the play in the ball bearings 11 to 14 may be eliminated to the desired degree so that the rotors 5, 6 are maintained in a desired axial position and so that a very small radial clearance may be maintained all around the rotors. The casing 1 is provided with an inlet opening 17 and an inlet chamber 18, and furthermore, with an outlet chamber 19 and an outlet opening 20 for the compressed air. 21 and 22 indicate the shaft seals at the high-pressure end of the compressor, and 23 and 24 the shaft seals at the low-pressure end of the compressor. The fixation of the rotors at the hot high-pressure ends of the rotors reduces the influence of temperature on the running conditions of the rotors. The rotors 5, 6 are provided with trunnions 25, 26 at the low-pressure ends which trunnions are mounted in and axially movable in radial roller bearings 27 and 28, respectively, provided in the casing. The trunnion 25 is connected through the medium of a torsion bar 40 in driving relation to the shaft 41 of a cylindrical helical pinion 29 which is driven by the larger cylindrical helical driving gear 30 mounted on a shaft 31. The helical pinion 29 is mounted in a roller bearing 32 and the helical gear 30 in a roller bearing 33 and twin angle ball bearings 34, 35. 36 is a lubricating oil pump driven by and coupled to the shaft 31, and 37 is a disengageable clutch by means of which the shaft 31 may be coupled to a high-speed motor (not illustrated). The incline of the teeth of the helical pinion 29 and the helical gear 30 and the direction of rotation indicated by the arrow 38 is such that a certain thrust is obtained from the helical pinion 29 towards the rotors 5, 6 when the rotors are driven which counteracts and partially balances the axial thrust on the rotors due to the differences in pressure between the high-pressure and low-pressure ends of the rotors and to the pressure variations along the rotors, and consequently the load on the ball bearings 11, 12 is correspondingly reduced. Similarly, the thrust of the pinion 30 and the clutch 37 act in opposite directions in order to reduce the load on the bearings 34, 35.

The screw-rotor compressor above described should be considered only as an example and may be modified in various ways within the scope of the claims.

What I claim is:

1. An elastic fluid compressor of the screw-rotor type comprising a casing having intersecting parallel bores, said casing having an inlet communicating with said bores at one of the ends thereof and an outlet communicating with said bores at the opposite ends thereof, male and female rotors mounted to rotate in said bores and having intermeshing helical lands and grooves forming between them and the bores working chambers communicating with said inlet and said outlet as the rotors revolve, synchronizing gears fixed to and interconnecting said rotors at one end thereof, a cylindrical helical pinion connected in driving relation to the opposite end of the male rotor, a cylindrical helical driving gear of larger diameter than that of said pinion for driving the latter, twin angularly disposed antifriction bearings capable of taking radial load and axial thrust in both directions for mounting said rotors at the synchronizing gear ends thereof and for locating said ends in fixed axial relation to the casing, cylindrical roller bearings for mounting the opposite ends of the rotors and permitting axial movement of said opposite ends relative to said casing, cylindrical roller bearings for mounting said pinion and permitting axial movement of the pinion relative to said casing, and antifriction bearings for mounting said driving gear, the hand and lead of the teeth of the pinion being related to the hand and lead of the lands of the male rotor so that the axial thrust developed by the pinion acts counter to the axial thrust produced by the working fluid on the rotor to which the pinion is connected.

2. A compressor as defined in claim 1 in which the antifriction bearings for mounting the rotors comprise angularly disposed ball bearings.

3. A compressor as defined in claim 1 in which the bearings for mounting said driving gear include at least one twin antifriction bearing assembly capable of taking radial load and axial thrust in both directions.

4. A compressor as defined in claim 1 in which the twin antifriction bearings for mounting the rotors are located at the high pressure end of the rotors.

5. A compressor as defined in claim 4 in which the low pressure end of the male rotor is mounted in cylindrical roller bearings and the pinion connected to the male rotor is also mounted in cylindrical roller bearings.

References Cited in the file of this patent

UNITED STATES PATENTS

| | | |
|---|---|---|
| 2,014,932 | Hallett | Sept. 17, 1935 |
| 2,243,874 | Lysholm | June 3, 1941 |
| 2,287,716 | Whitfield | June 23, 1942 |
| 2,369,539 | Delamere | Feb. 13, 1945 |
| 2,477,004 | Paget | July 26, 1949 |
| 2,578,196 | Montelius | Dec. 11, 1951 |